United States Patent [19]

Hurter

[11] Patent Number: 5,371,201
[45] Date of Patent: Dec. 6, 1994

[54] AZO DYES AND PREPARATION AND USE THEREOF

[75] Inventor: Rudolf Hurter, Basel, Switzerland

[73] Assignee: Giba-Geigy Corporation, Ardsley, N.Y.

[21] Appl. No.: 48,081

[22] Filed: Apr. 15, 1993

Related U.S. Application Data

[63] Continuation-in-part of Ser. No. 989,735, Dec. 10, 1992, which is a continuation of Ser. No. 793,057, Nov. 18, 1991, abandoned, which is a continuation-in-part of Ser. No. 700,003, May 14, 1991, abandoned.

[30] Foreign Application Priority Data

May 18, 1990 [CH] Switzerland ............. 1700/90
May 5, 1992 [CH] Switzerland ............. 1437/92

[51] Int. Cl.$^5$ ................................. C07C 245/22
[52] U.S. Cl. .................................... 534/819
[58] Field of Search ........................... 534/819

[56] References Cited

U.S. PATENT DOCUMENTS

| | | |
|---|---|---|
| 3,034,848 | 5/1962 | King . |
| 3,615,581 | 10/1971 | Kabitzke . |
| 3,623,874 | 11/1971 | Froehlich . |
| 3,634,091 | 1/1972 | Loeflel . |
| 3,951,944 | 4/1976 | Fuchs ............... 260/186 |
| 3,960,831 | 6/1976 | Nickel ............... 260/186 |

FOREIGN PATENT DOCUMENTS 0152765  8/1985  European Pat. Off. .
0457729 11/1991  European Pat. Off. .
1923680 11/1970  Germany .

OTHER PUBLICATIONS

Chem Abstract: PCA72(2):4343y, Disazo dyes for the silver bleach process: Kabitzke et al. (Belg. BE 715411 Nov. 20, 1968). CA 74(2,4): 127563u (1970) Loettel et al.
CA 73 (8): 36607z (1969) Froehlich.
CA102: 54008b (JP59159159), (1984).
CA 102:229508u (JP60023474), (1985).

*Primary Examiner*—Johann Richter
*Assistant Examiner*—John Peabody
*Attorney, Agent, or Firm*—Kevin T. Mansfield

[57] ABSTRACT

The invention relates to azo dyes of formula

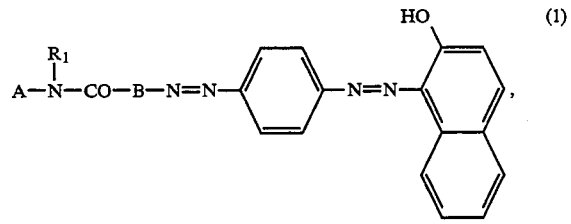

wherein A, B and $R_1$ are as defined in claim 1. The azo dyes of formula (1) give dyeings of good fastness properties on nitrogen-containing or hydroxy group-containing fibre materials, paper or leather.

12 Claims, No Drawings

AZO DYES AND PREPARATION AND USE THEREOF

This is a continuation-in-part of application Serial No. 07/989,735 filed Dec. 10, 1992, currently pending, which is a continuation of application Ser. No. 07/793,057 filed Nov. 18, 1991, abandoned, which is a continuation-in-part of application Ser. No. 07/700,003 filed May 14, 1991, abandoned.

The present invention relates to novel azo dyes, processes for preparing them and the use of these dyes for dyeing and printing fibre materials, in particular textile fibre materials.

The present invention accordingly provides azo dyes of the formula

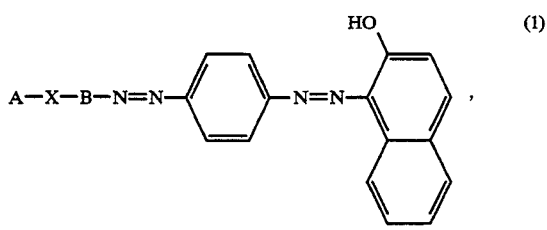

where A and B are each independently of the other substituted or unsubstituted phenyl or naphthyl and X is —N(R$_1$)—SO$_2$—, —O—SO$_2$— or —SO$_2$—N(R$_1$)—, where R$_1$ is hydrogen or C$_1$–C$_8$alkyl.

Suitable substituents for the radicals A and B are independently of one another for example alkyl groups of from 1 to 8, preferably from 1 to 4, carbon atoms, e.g. methyl, ethyl, propyl, isopropyl, butyl, isobutyl, sec-butyl, tert-butyl, pentyl, hexyl, heptyl or octyl, alkoxy groups of from 1 to 8 carbon atoms, in particular of from 1 to 4 carbon atems, e.g. methoxy, ethoxy, propoxy, isopropoxy or butoxy, acylamino groups such as alkanoylamino groups of from 2 to 8 carbon atoms and alkoxycarbonylamino groups of from 2 to 8 carbon atoms, e.g. acetylamino, propionylamino, methoxycarbonylamino or ethoxycarbonylamino, alkanoyl groups of from 2 to 8, preferably from 2 to 4, carbon atoms, e.g. acetyl, propionyl, butyryl or isobutyryl, unsubstituted or C$_1$–C$_8$alkyl-, C$_1$–C$_8$alkoxy-, halogeno-, carboxyl- or sulfo-substituted phenylaminosulfonyl or naphthylaminosulfonyl, nitro, cyano, trifluoromethyl, halogen, such as fluorine, bromine or in particular chlorine, carbamoyl, sulfamoyl, ureido, hydroxyl, carboxyl, sulfo or sulfato.

A C$_1$–C$_8$alkyl R$_1$ in formula (1) may be for example methyl, ethyl, propyl, isopropyl, butyl, isobutyl, sec-butyl, tert-butyl, pentyl, hexyl, heptyl or octyl.

The meanings specified for X under formula (1) should be read from left to fight and are to be understood in that form as meanings of X in the formula (1).

Preference is given to azo dyes of the formula (1) where R$_1$ is hydrogen or C$_1$–C$_4$alkyl, in particular methyl.

Preference is likewise given to azo dyes of the formula (1) where A and B are each independently of the other phenyl or naphthyl which may each be substituted by C$_1$–C$_8$alkyl, C$_1$–C$_8$alkoxy, halogen, carboxyl, sulfo or a phenylaminosulfonyl or naphthylaminosulfonyl radical which may in turn be further substituted by C$_1$–C$_8$alkyl, C$_1$–C$_8$alkoxy, halogen, carboxyl or sulfo, preferably sulfo, in particular where A and B are each independently of the other unsubstituted or C$_1$–C$_8$alkyl-, C$_1$–C$_8$alkoxy-, halogen-, carboxyl- or sulfo-substituted phenyl or naphthyl.

Preference is further given to azo dyes of the formula (1) where A is phenyl which may be substituted by C$_1$–C$_4$alkyl, C$_1$–C$_4$alkoxy, halogen, carboxyl, sulfo or a phenylaminosulfonyl or naphthylaminosulfonyl radical which may in turn be further substituted by C$_1$–C$_8$alkyl, C$_1$–C$_8$alkoxy, halogen, carboxyl or sulfo.

Preference is further given to azo dyes of the formula (1) where B is unsubstituted or C$_1$–C$_4$alkyl-, C$_1$–C$_4$alkoxy-, halogen-, carboxyl- or sulfo-substituted phenyl.

Preferably, in the azo dyes of the formula (1), A is phenyl which may be substituted by C$_1$–C$_4$alkyl, C$_1$–C$_4$alkoxy, halogen, carboxyl, sulfo or a phenylaminosulfonyl or naphthylaminosulfonyl radical which may in turn be further substituted by C$_1$–C$_8$alkyl, C$_1$–C$_8$alkoxy, halogen, carboxyl or sulfo, and B is unsubstituted or C$_1$–C$_4$alkyl-, C$_1$–C$_4$alkoxy-, halogen-, carboxyl- or sulfo-substituted phenyl.

The azo dyes of the formula (1) preferably contain only one or two sulfo groups, in particular only one sulfo group.

Preference is likewise given to azo dyes of the formula (1) where X is —N(R$_1$)—SO$_2$—, —O—SO$_2$— or —SO$_2$—NH—, preferably where X is —N(R$_1$)—SO$_2$—, and R$_1$ is hydrogen or C$_1$–C$_4$alkyl, in particular hydrogen.

Of interest are azo dyes of the formula (1) where A and B are each independently of the other unsubstituted or C$_1$–C$_4$alkyl-, C$_1$–C$_4$alkoxy-, halogen-, carboxyl- or sulfo-substituted phenyl or naphthyl, X is —N(R$_1$)—SO$_2$— and R$_1$ is hydrogen or C$_1$–C$_4$alkyl, in particular hydrogen, and the azo dyes of the formula (1) contain only one or two sulfo groups, in particular only one sulfo group.

Particular preference is given to azo dyes of the formula

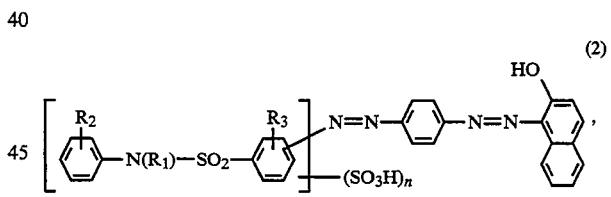

where R$_1$ is hydrogen or C$_1$–C$_4$alkyl, in particular hydrogen, R$_2$ is hydrogen, C$_1$–C$_4$alkyl, C$_1$–C$_4$alkoxy, halogen, carboxyl or unsubstituted or sulfo-substituted phenylaminosulfonyl or naphthylaminosulfonyl, R$_3$ is hydrogen, C$_1$–C$_4$alkyl, C$_1$–C$_4$alkoxy, halogen or carboxyl, and n is 1 or 2.

Very particular preference is given to azo dyes of the formula

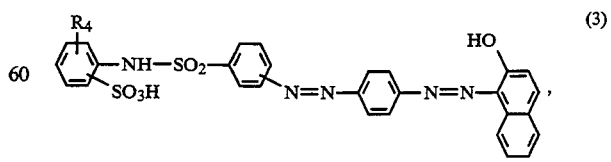

where R$_4$ is hydrogen or methyl, in particular hydrogen.

The present invention further provides dye mixtures which contain at least two azo dyes of the formula (1)

which are subject to the above definitions and expressions of preferences.

The present invention further provides dye mixtures which contain an azo dye of the formula

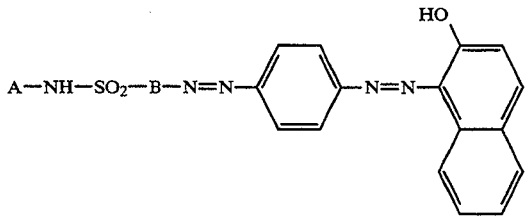

at least one of the dyes of formulae

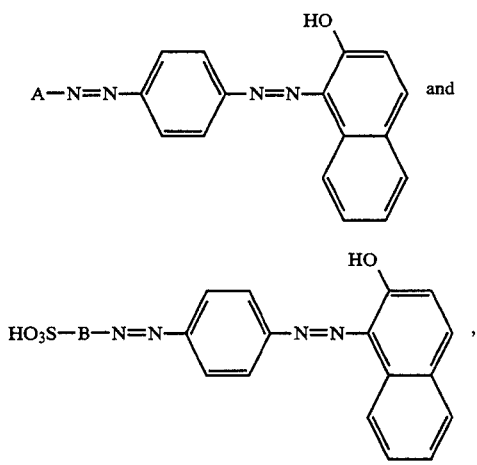

where A and B are each independently of the other substituted or unsubstituted phenyl or naphthyl. As to the definitions of A and B the same preferences apply as given hereinbefore.

The present invention further provides a process for preparing the azo dyes of the formula (1), which comprises diazotising an amine of the formula

A—X—B—NH$_2$     (4)

where A, B and X are each as defined for the formula (1), coupling the diazonium salt with a compound of the formula

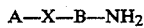
(5)

where R$_5$ is hydrogen or —CH$_2$—SO$_3$H, converting the resulting product if R$_5$ is —CH$_2$—SO$_3$H to the compound of the formula

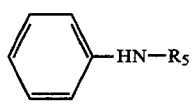
(6)

diazotising the compound of the formula (6) and coupling the diazonium salt with a compound of the formula

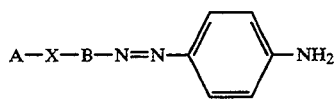
(7)

Mixtures of dyes of the formula (1) can be prepared for example by mixed synthesis, which consists in proceeding as above but using at least two compounds of the formula (4).

The compounds of the formulae (4) and (6) are each diazotised in a conventional manner, for example with a nitrite, e.g. an alkali metal nitrite such as sodium nitrite, in a medium acidified with a mineral acid, for example hydrochloric acid, at temperatures of for example from $-5°$ to $30°$ C., preferably at from $0°$ to $10°$ C.

The couplings with the coupling components of the formulae (5) and (7) are each effected in a conventional manner, at an acidic, neutral or alkaline pH and at temperatures of for example from $-5°$ to $30°$ C., preferably at from $0°$ to $15°$ C.

The conversion of the reaction product obtained from the coupling of the compound of the formula (4) with the compound of the formula (5) into a compound of the formula (6) is necessary only on using a compound of the formula (5) where R$_5$ is —CH$_2$—SO$_3$H. In this case, the conversion is effected in the presence of a base, e.g. sodium hydroxide, at a temperature of for example from $40°$ to $100°$ C., in particular at a temperature of from $80°$ to $100°$ C.

An alkyl R$_1$ can also be introduced after the preparation of the dye of the formula (1), for example by alkylation with a dialkyl sulfate, a dialkyl carbonate, a dialkyl methanephosphonate or a methyl toluenesulfonate derivative, in aqueous solution. in a manner known per se.

Alternatively, dyes of the formula (1) where X is —N(R$_1$)—SO$_2$— may be prepared by reacting a compound of the formula

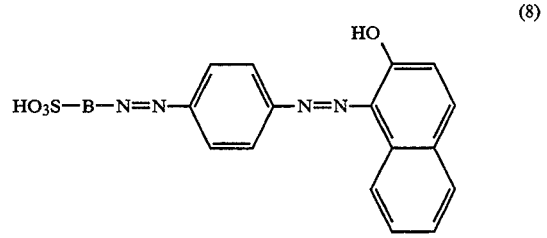
(8)

with a halogenating agent to give a compound of the formula

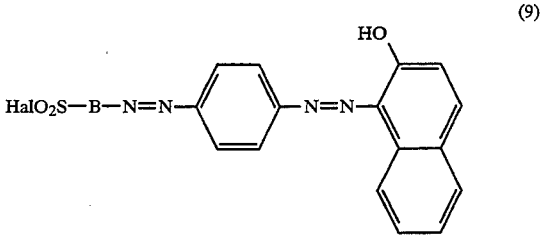
(9)

and then reacting the compound of the formula (9) with a compound of the formula

A—N(R₁)H  (10), where A, B and R₁ are each as defined for the formula (1) and Hal is halogen, in particular chlorine.

The reaction of the compound of the formula (8) with a halogenating agent, for example thionyl chloride or sulfuryl chloride, to give a compound of the formula (9) is carried out in an organic solvent, for example sulfolane, dimethyl sulfoxide or dimethylformamide, in a manner known per se. The reaction of the compound of the formula (9) with a compound of the formula (10) is effected in a conventional manner.

Preferred embodiments of the process of the present invention comprise using
- a compound of the formula (4) where R₁ is hydrogen or C₁–C₄alkyl, in particular methyl;
- a compound of the formula (4) where A and B are each independently of the other phenyl or naphthyl which may each be substituted by C₁–C₈alkyl, C₁–C₈alkoxy, halogen, carboxyl, sulfo or a phenylaminosulfonyl or naphthylaminosulfonyl radical which may in turn be further substituted by C₁–C₈alkyl, C₁–C₈alkoxy, halogen, carboxyl or sulfo;
- a compound of the formula (4) where A is phenyl which may be substituted by C₁–C₄alkyl, C₁–C₄alkoxy, halogen, carboxyl, sulfo or a phenylaminosulfony or naphthylaminosulfonyl radical which may in turn be further substituted by C₁–C₈alkyl, C₁–C₈alkoxy, halogen, carboxyl or sulfo;
- a compound of the formula (4) where B is unsubstituted or C₁–C₄alkyl-, C₁–C₄alkoxy-, halogen-, carboxyl- or sulfo-substituted phenyl;
- a compound of the formula (4) which contains only one or two sulfo groups, in particular only one sulfo group;
- a compound of the formula (4) where X is —N(R₁)—SO₂— and R₁ is hydrogen or C₁–C₄alkyl, in particular hydrogen;
- a compound of the formula (5) where R₅ is —CH₂—SO₃H and converting the reaction product obtained from the coupling of the compound of the formula (4) with the compound of the formula (5) into a compound of the formula (6).

Preferably, A and B in the compound of the formula (4) are each phenyl which may be substituted by C₁–C₄alkyl, C₁–C₄alkoxy, halogen, carboxyl or sulfo, in particular by methyl, methoxy, chlorine, carboxyl or sulfo.

An interesting embodiment of the process of the present invention comprises coupling a compound of the formula (4) where A and B are each independently of the other unsubstituted or C₁–C₄alkyl-, C₁–C₄alkoxy-, halogen-, carboxyl- or sulfo-substituted phenyl or naphthyl, X is —N(R₁)—SO₂— and R₁ is hydrogen or C₁–C₄alkyl, in particular hydrogen, and the compound of the formula (4) contains only one or two sulfo groups, in particular only one sulfo group, with a compound of the formula (5) where R₅ is —CH₂—SO₃H.

A particularly preferred embodiment of the process of the present invention comprises coupling a compound of the formula

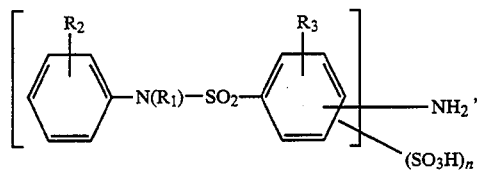

(11)

where $R_1$, $R_2$, $R_3$ and n are each as defined for the formula (2), with a compound of the formula

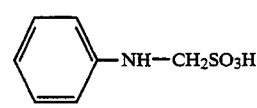

(12)

A very particularly preferred embodiment of the process of the present invention comprises coupling a compound of the formula

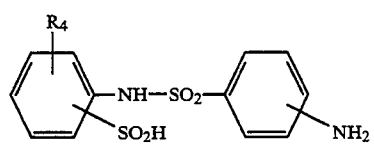

(13)

where $R_4$ is as defined for the formula (3), with a compound of the formula (12).

Dye mixtures which contain an azo dye of the formula

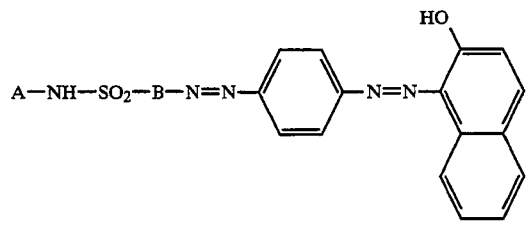

and at least one of the dyes of formulae

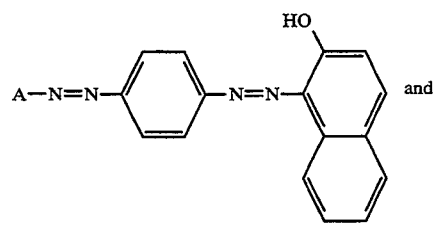

and

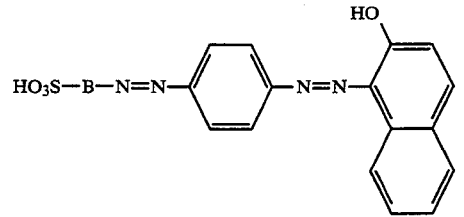

for example can be obtained by reacting a compound of formula

A—NH₂  (14)

with a compound of formula

NO₂—B—SO₂—Hal    (15), and reducing the reaction product obtained. The following steps are the same as those given hereinbefore for the preparation of the azo dyes of the formula (1), wherein the above reaction product obtained after reduction is used instead of the amine of formula (4).

For A and B the same meanings and preferences apply as given hereinbefore. In formula (15) Hal is halogen, preferably chlorine.

The reaction of the compounds of formlae (14) and (15) is carded out in a conventional manner, for example in water as a solvent and at a pH of from 3 to 7.

The reduction is carded out in a conventional manner, for example in the presence of iron powder, in aqueous medium at a temperature of preferably 90° to 100° C., most preferably the reduction is carried out at the boil.

The amines of the formula (4) and the compounds of the formula (5), (14) and (15) are known per se or can be prepared similarly to known compounds.

The dyes of the formula (1) are present either in the form of their free acid or preferably as salts thereof.

Suitable salts are for example the alkali metal or ammonium salts or the salts of an organic amine.

Examples are sodium, lithium, potassium and ammonium salts and the salts of mono-, di- or triethanolamine.

The azo dyes of the formula (1) and the mixtures of dyes of the present invention are suitable for dyeing and printing in a conventional manner, in particular nitrogen-containing or hydroxyl-containing fibre materials, paper or leather, for example textile fibre materials made of cellulose, silk and in particular wool and synthetic polyamides. The azo dyes of the formula (1) and the mixtures of dyes of the present invention can be used for dyeing or printing in a generally customary, possibly pretreated form. Level dyeings are obtained in red shades having good all round fastness properties, in particular good rub, wet, wet rub and light fastness. Furthermore, the dyes and the mixtures of dyes of the present invention are very readily water-soluble. Moreover, the dyes of the present invention and the mixtures of dyes have very good build-up properties and are very highly compatible with other dyes. The abovementioned textile material can be present in a wide range of forms, for example as fibre, yarn, woven fabric or knitted fabric.

In the examples which follow, parts are by weight. The temperatures are in degrees Celsius. Parts by weight bear the same relation to parts by volume as the gram to the cubic centimetre.

EXAMPLE 1

The first step comprises preparing a mixture of 41 parts of 41% aqueous sodium bisulfite solution and 13 parts of 37% aqueous formaldehyde solution, stirring for a short time and adding 13.95 parts of aniline at 65°. Gradually a clear solution forms, which forms a crystalline solid on cooling down in the course of 2 hours. The reaction mixture is then diluted with 140 parts of water, heated to 60° and stirred until a clear solution is formed. Ice is added to cool down to 5°, followed by 16.8 parts of sodium bicarbonate.

In a second step, 49.2 parts of a compound which in the form of the free acid conforms to the formula

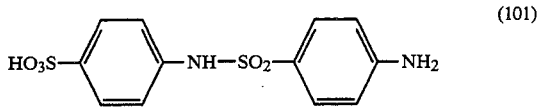

are dissolved in a separate reaction flask in 150 parts of water at pH 7.5 with concentrated aqueous sodium hydroxide solution, and 37.5 parts of 4N sodium nitrite solution are then added. The reaction mixture is added dropwise to a mixture of 150 parts of ice and 37.5 parts of approximately 32% hydrochloric acid solution. The diazo suspension thus obtained is added to the solution obtained in the first step. After some hours, 190 parts of sodium chloride are added and the reaction product is then filtered off. 180 parts are obtained of a still moist reaction product which in the form of the free acid corresponds to the compound of the formula

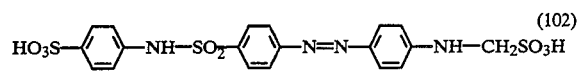

180 parts of the compound of the formula (102) obtained as described above are then added to 450 parts of a 7% aqueous sodium hydroxide solution and the mixture is heated at the boil for 2 to 3 hours. After cooling down to room temperature, a pH of about 0.5 is set with approximately 32% of hydrochloric acid solution. The precipitated product is filtered off, washed with water and dried under reduced pressure at a temperature of from 50° to 60°. This leaves 43.9 parts of a reaction product which in the form of the free acid corresponds to the compound of the formula

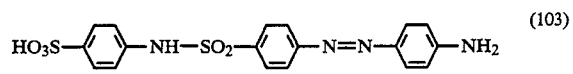

4.32 parts of the compound of the formula (103) obtained as described above are dissolved in 50 parts of water at pH 7.5 with dilute aqueous sodium hydroxide solution, and 2.5 parts of 4N aqueous sodium nitrite solution are added. The mobile suspension is heated to 55° and added dropwise to a mixture of 50 parts of ice and 2.5 parts of approximately 32% hydrochloric acid solution. The reaction mixture is then stirred for 30 minutes and added at about pH 8.5 and a temperature of from 2° to 5° to a solution prepared beforehand by dissolving 1.44 parts of 2-naphthol in 100 parts of warm water in the presence of 5 parts of 2N aqueous sodium hydroxide solution and 1.06 parts of sodium carbonate and then cooling to a temperature of 2°. After the coupling has ended, the reaction mixture thus obtained is admixed with 18 parts of sodium chloride, and the precipitated dye is filtered off, washed with dilute aqueous sodium chloride solution and ice-water and dried under reduced pressure at a temperature of from 50° to 60°. This leaves 3.8 pans of a dye which in the form of the free acid corresponds to the compound of the formula

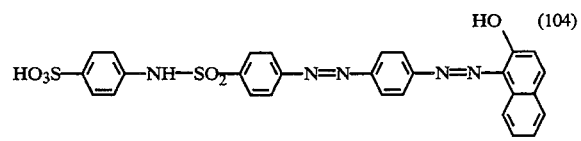

The dye of the formula (104) dyes natural and synthetic polyamide in red shades.

EXAMPLES 2 TO 101

The procedure described in Example 1 is repeated, except that the 49.2 parts of the compound of the formula (101) are replaced by one of the amines shown below in column 2 of the table in the form of the free acid, affording similar dyes which dye natural and synthetic polyamide in red shades.

TABLE

| Ex. | Amine | |
|---|---|---|
| 2 | 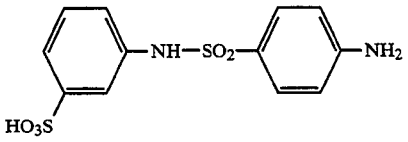 | (105) |
| 3 | 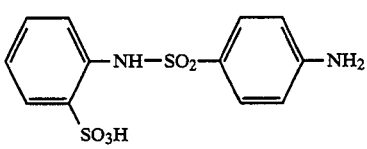 | (106) |
| 4 | 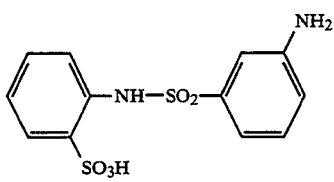 | (107) |
| 5 | 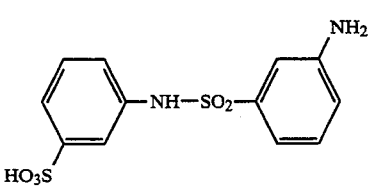 | (108) |
| 6 | 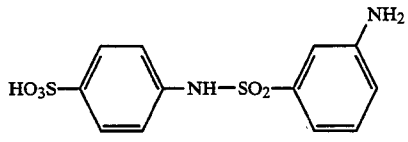 | (109) |
| 7 | 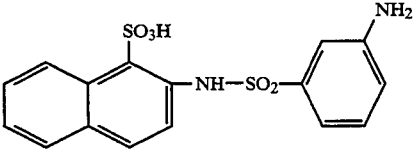 | (110) |
| 8 | 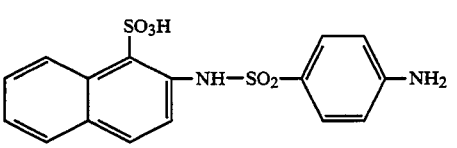 | (111) |
| 9 | 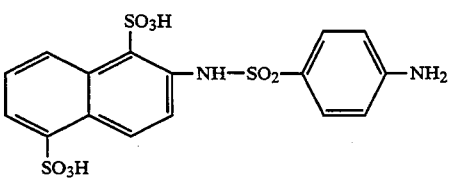 | (112) |

TABLE-continued

| Ex. | Amine | |
|---|---|---|
| 10 | 2-amino-5-(3-aminobenzenesulfonylamino)naphthalene-1,5-disulfonic acid structure | (113) |
| 11 | 6-amino-2-(4-sulfophenylaminosulfonyl)naphthalene structure | (114) |
| 12 | 6-amino-2-(3-sulfophenylaminosulfonyl)naphthalene structure | (115) |
| 13 | 6-amino-2-(2-sulfophenylaminosulfonyl)naphthalene structure | (116) |
| 14 | 6-amino-2-(2,5-disulfophenylaminosulfonyl)naphthalene structure | (117) |
| 15 | 2-(6-aminonaphthalen-2-ylsulfonylamino)naphthalene-1-sulfonic acid structure | (118) |
| 16 | 2-(6-aminonaphthalen-2-ylsulfonylamino)naphthalene-1,5-disulfonic acid structure | (119) |
| 17 | 6-amino-2-(6-sulfonaphthalen-2-ylaminosulfonyl)naphthalene structure | (120) |
| 18 | 6-(4-aminophenylsulfonylamino)naphthalene-2-sulfonic acid structure | (121) |

TABLE-continued
| Ex. | Amine | |
|---|---|---|
| 19 | 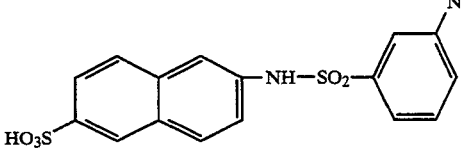 | (122) |
| 20 | 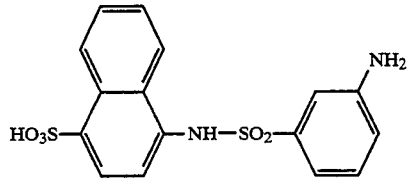 | (123) |
| 21 | 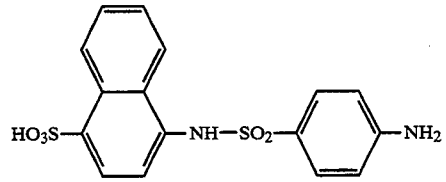 | (124) |
| 22 | 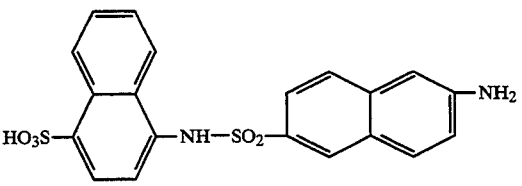 | (125) |
| 23 | 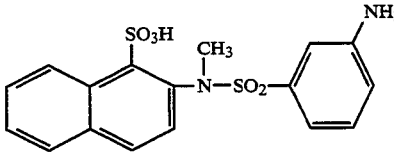 | (126) |
| 24 | 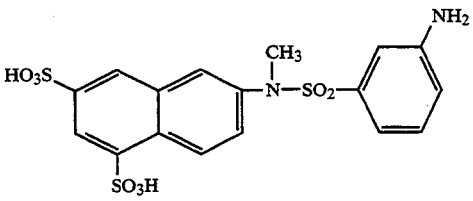 | (127) |
| 25 | 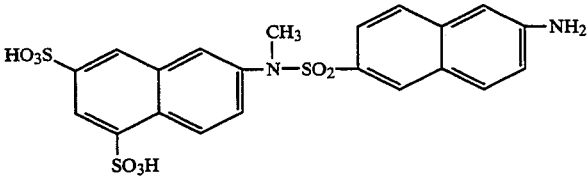 | (128) |
| 26 | 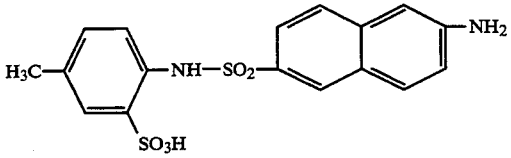 | (129) |

TABLE-continued

| Ex. | Amine | |
|---|---|---|
| 27 | 4-methyl-2-sulfo-phenyl-NH-SO$_2$-(3-aminophenyl) | (130) |
| 28 | 4-methyl-2-sulfo-phenyl-NH-SO$_2$-(4-aminophenyl) | (131) |
| 29 | 2-methyl-4-sulfo-phenyl-NH-SO$_2$-(4-aminophenyl) | (132) |
| 30 | 2-methyl-4-sulfo-phenyl-NH-SO$_2$-(3-aminophenyl) | (133) |
| 31 | 4-methyl-3-sulfo-phenyl-NH-SO$_2$-(3-aminophenyl) | (134) |
| 32 | 4-methoxy-2-sulfo-phenyl-NH-SO$_2$-(4-aminophenyl) | (135) |
| 33 | 4-methoxy-2-sulfo-phenyl-NH-SO$_2$-(3-aminophenyl) | (136) |
| 34 | 2-chloro-5-sulfo-phenyl-NH-SO$_2$-(3-aminophenyl) | (137) |
| 35 | 2-chloro-5-sulfo-phenyl-NH-SO$_2$-(4-aminophenyl) | (138) |
| 36 | 4-chloro-3-sulfo-phenyl-NH-SO$_2$-(4-aminophenyl) | (139) |

TABLE-continued

| Ex. | Amine | |
|---|---|---|
| 37 | 2-amino-5-sulfo-benzoic acid sulfonamide with 4-aminoaniline: HO3S–C6H3(COOH)–NH–SO2–C6H4–NH2 | (140) |
| 38 | HO3S–C6H3(COOH)–NH–SO2–(naphthyl)–NH2 (6-amino-2-naphthyl) | (141) |
| 39 | 3,5-dimethyl-4-sulfo-phenyl-NH-SO2-(3-aminophenyl); with CH3 at 2, H3C at 4, SO3H at 5 | (142) |
| 40 | 2-methoxy-4-sulfo-5-methyl-phenyl-NH-SO2-(3-aminophenyl) | (143) |
| 41 | 2-methoxy-4-sulfo-5-methyl-phenyl-NH-SO2-(4-aminophenyl) | (144) |
| 42 | 5-chloro-4-methyl-2-sulfo-phenyl-NH-SO2-(4-aminophenyl) | (145) |
| 43 | 5-methyl-4-chloro-2-sulfo-phenyl-NH-SO2-(4-aminophenyl) | (146) |
| 44 | 2,5-dichloro-4-sulfo-phenyl-NH-SO2-(4-aminophenyl) | (147) |
| 45 | 2,5-dichloro-4-sulfo-phenyl-NH-SO2-(3-aminophenyl) | (148) |

TABLE-continued

| Ex. | Amine | |
|---|---|---|
| 46 | 4-HO₃S-2-CH₃-C₆H₃-NH-SO₂-(2-CH₃-5-NH₂-C₆H₃) | (149) |
| 47 | 4-HO₃S-C₆H₄-NH-SO₂-(2-CH₃-5-NH₂-C₆H₃) | (150) |
| 48 | 3-HO₃S-C₆H₄-NH-SO₂-(2-CH₃-5-NH₂-C₆H₃) | (151) |
| 49 | 3-HO₃S-C₆H₄-NH-SO₂-(4-Cl-3-NH₂-C₆H₃) | (152) |
| 50 | 4-HO₃S-C₆H₄-NH-SO₂-(4-Cl-3-NH₂-C₆H₃) | (153) |
| 51 | 4-HO₃S-C₆H₄-NH-SO₂-(3,4-di-CH₃-5-NH₂-C₆H₂) | (154) |
| 52 | 4-HO₃S-C₆H₄-O-SO₂-(4-NH₂-C₆H₄) | (155) |
| 53 | 4-HO₃S-C₆H₄-O-SO₂-(3-NH₂-C₆H₄) | (156) |
| 54 | 4-HO₃S-C₆H₄-O-SO₂-(4-CH₃-3-NH₂-C₆H₃) | (157) |

Note: The structures are sulfonamide and sulfonate ester derivatives. Structures as drawn:

- (149) 4-sulfo-2-methylphenyl-NH-SO₂-(2-methyl-5-aminophenyl)
- (150) 4-sulfophenyl-NH-SO₂-(2-methyl-5-aminophenyl)
- (151) 3-sulfophenyl-NH-SO₂-(2-methyl-5-aminophenyl)
- (152) 3-sulfophenyl-NH-SO₂-(4-chloro-3-aminophenyl)
- (153) 4-sulfophenyl-NH-SO₂-(4-chloro-3-aminophenyl)
- (154) 4-sulfophenyl-NH-SO₂-(3,4-dimethyl-5-aminophenyl)
- (155) 4-sulfophenyl-O-SO₂-(4-aminophenyl)
- (156) 4-sulfophenyl-O-SO₂-(3-aminophenyl)
- (157) 4-sulfophenyl-O-SO₂-(4-methyl-3-aminophenyl)

| Ex. | Amine | |
|---|---|---|
| 55 | HO₃S—⟨phenyl⟩—O—SO₂—⟨phenyl(NH₂)(Cl)⟩ | (158) |
| 56 | HO₃S—⟨naphthyl⟩—O—SO₂—⟨phenyl⟩—NH₂ | (159) |
| 57 | (HO₃S)(SO₃H)—⟨naphthyl⟩—O—SO₂—⟨phenyl⟩—NH₂ | (160) |
| 58 | ⟨phenyl⟩—SO₂—NH—⟨phenyl(NH₂)(SO₃H)⟩ | (161) |
| 59 | H₃C—⟨phenyl⟩—SO₂—NH—⟨phenyl(NH₂)(SO₃H)⟩ | (162) |
| 60 | ⟨phenyl⟩—SO₂—NH—⟨phenyl(SO₃H)(NH₂)⟩ | (163) |
| 61 | H₃C—⟨phenyl⟩—SO₂—NH—⟨phenyl(SO₃H)(NH₂)⟩ | (164) |
| 62 | Cl,HO₃S—⟨phenyl⟩—NH—SO₂—⟨phenyl⟩—NH₂ | (165) |
| 63 | Cl,SO₃H—⟨phenyl⟩—NH—SO₂—⟨phenyl⟩—NH₂ | (166) |
| 64 | Cl,SO₃H—⟨phenyl⟩—NH—SO₂—⟨phenyl⟩—NH₂ | (167) |

TABLE-continued

| Ex. | Amine | |
|---|---|---|
| 65 | 4-HO$_3$S-C$_6$H$_3$-N(CH$_3$)-SO$_2$-C$_6$H$_4$-NH$_2$ (3-amino) | (168) |
| 66 | 3-amino-5-HO$_3$S-C$_6$H$_3$-N(CH$_3$)-SO$_2$-C$_6$H$_4$-NH$_2$ (4-amino) | (169) |
| 67 | 4-HO$_3$S-C$_6$H$_4$-N(CH$_3$)-SO$_2$-C$_6$H$_4$-NH$_2$ (4-amino) | (170) |
| 68 | 4-HO$_3$S-C$_6$H$_4$-N(CH$_2$CH$_3$)-SO$_2$-C$_6$H$_4$-NH$_2$ (4-amino) | (171) |
| 69 | 1,5-disulfo-naphthalen-2-yl-N(CH$_3$)-SO$_2$-C$_6$H$_4$-NH$_2$ (4-amino) | (172) |
| 70 | 1,5-disulfo-naphthalen-2-yl-N(CH$_3$)-SO$_2$-C$_6$H$_4$-NH$_2$ (3-amino) | (173) |
| 71 | 3,5-disulfo-naphthalen-7-yl-N(CH$_3$)-SO$_2$-C$_6$H$_4$-NH$_2$ (4-amino) | (174) |
| 72 | 4,8-disulfo-naphthalen-2-yl-N(CH$_3$)-SO$_2$-C$_6$H$_4$-NH$_2$ (4-amino) | (175) |
| 73 | 3,6-disulfo-naphthalen-2-yl-N(CH$_3$)-SO$_2$-C$_6$H$_4$-NH$_2$ (4-amino) | (176) |

TABLE-continued

| Ex. | Amine | |
|---|---|---|
| 74 | 8-(N-methyl-N-(4-aminophenylsulfonyl)amino)naphthalene-1,6-disulfonic acid structure with $HO_3S$ groups, $N(CH_3)-SO_2-C_6H_4-NH_2$ | (177) |
| 75 | 4-chloro-3-sulfo-N-methyl-N-(3-aminophenylsulfonyl)aniline | (178) |
| 76 | 4-chloro-3-sulfo-N-methyl-N-(4-aminophenylsulfonyl)aniline | (179) |
| 77 | $HO_3S-C_6H_4-NH-SO_2-C_6H_4-NH-SO_2-C_6H_4-NH_2$ (para) | (180) |
| 78 | $HO_3S-C_6H_4-NH-SO_2-C_6H_4-NH-SO_2-C_6H_4-NH_2$ (with meta $NH_2$) | (181) |
| 79 | 2,5-disulfo-phenyl-NH-SO$_2$-C$_6$H$_4$-NH-SO$_2$-C$_6$H$_4$-NH$_2$ | (182) |
| 80 | 2-amino-naphthalene-1,5-disulfonic acid linked via $NH-SO_2-C_6H_4-NH-SO_2-C_6H_4-NH_2$ | (183) |
| 81 | $HO_3S-C_6H_4-NH-SO_2-C_6H_4(meta)-NH-SO_2-C_6H_4-NH_2$ | (184) |
| 82 | 2,5-disulfo-phenyl-NH-SO$_2$-C$_6$H$_4$-NH$_2$ | (185) |

| Ex. | Amine | |
|---|---|---|
| 83 | 7-[(3-aminophenyl)sulfonylamino]naphthalene-1,6-disulfonic acid structure (SO₃H at 1, HO₃S at 6, NH-SO₂-C₆H₄-NH₂ at 7) | (186) |
| 84 | naphthalene with HO₃S, SO₃H and NH-SO₂-C₆H₄-NH₂ substituents | (187) |
| 85 | naphthalene-1,4-disulfonic acid with NH-SO₂-C₆H₄-NH₂ substituent | (188) |
| 86 | naphthalene-2,7-disulfonic acid with NH-SO₂-C₆H₄-NH₂ substituent | (189) |
| 87 | naphthalene disulfonic acid with NH-SO₂-C₆H₄-NH₂ substituent | (190) |
| 88 | naphthalene disulfonic acid with NH-SO₂-C₆H₄-NH₂ substituent | (191) |
| 89 | naphthalene disulfonic acid with NH-SO₂-C₆H₄-NH₂ substituent | (192) |

TABLE-continued

| Ex. | Amine | |
|---|---|---|
| 90 | 3-sulfo-8-sulfo-naphthalen-1-yl — NH—SO$_2$ — (3-aminophenyl) | (193) |
| 91 | 3-sulfo-7-sulfo-naphthalen-1-yl — NH—SO$_2$ — (3-aminophenyl) | (194) |
| 92 | (4-chloro-3-sulfophenyl) — NH—SO$_2$ — (3-amino-4-chlorophenyl) | (195) |
| 93 | (2-chloro-5-sulfophenyl) — NH—SO$_2$ — (3-amino-4-chlorophenyl) | (196) |
| 94 | (4-chloro-2-sulfophenyl) — NH—SO$_2$ — (3-amino-4-chlorophenyl) | (197) |
| 95 | (2-sulfo-4-sulfophenyl) — NH—SO$_2$ — (3-amino-4-chlorophenyl) | (198) |
| 96 | (3-sulfo-5-sulfophenyl) — NH—SO$_2$ — (3-amino-4-chlorophenyl) | (199) |
| 97 | (4-methyl-2-sulfophenyl) — NH—SO$_2$ — (3-amino-4-chlorophenyl) | (200) |

Note: The above table summarizes the structures depicted; each entry shows an arylsulfonamide linking a substituted phenyl/naphthyl (with SO$_3$H and/or Cl or CH$_3$ substituents) to an aminophenyl group via —NH—SO$_2$—.

| Ex. | Amine | |
|---|---|---|
| 98 |  (structure with HO₃S-phenyl(CH₃)-NH-SO₂-phenyl(Cl)-NH₂) | (201) |
| 99 | (naphthalene with SO₃H at 1, SO₃H at 5, NH-SO₂-phenyl(Cl)-NH₂ at 2) | (202) |
| 100 | (naphthalene with SO₃H, HO₃S, NH-SO₂-phenyl(Cl)-NH₂) | (203) |
| 101 | (naphthalene with HO₃S, SO₃H, NH-SO₂-phenyl(Cl)-NH₂) | (204) |

EXAMPLE 102

45.8 parts of a compound which in the form of the free acid conforms to the formula

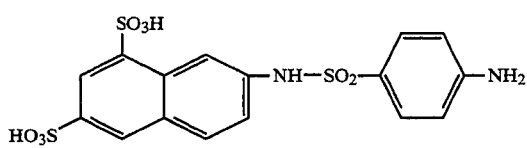

(205)

are dissolved in 160 parts of water at pH 7 with concentrated aqueous sodium hydroxide solution, 25 parts of approximately 32% hydrochloric acid solution are added and the mixture is cooled down to 2° C. Then 25 parts of 4N sodium nitrite solution are added dropwise and the suspension is stirred for one hour. 18.7 parts of anilino-methane sulfonic acid are added and a pH of 6–7 is set with 15 parts of sodium hydrogen carbonate. This leaves 290 parts of a solution containing a compound which in the form of the free acid conforms to the formula

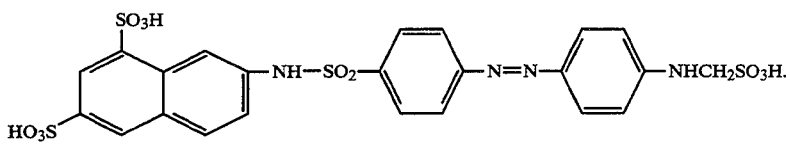

(206)

To the solution obtained as given above 50 parts of concentrated aqueous sodium hydroxide solution are added and the solution is heated at the boil for 90 minutes. After cooling down to room temperature, a pH of about 6 is set up with approximately 32% hydrochloric acid solution and 21 parts of sodium chloride are added. The precipitated product is filtered off, washed with a 20% sodium chloride solution and dried under reduced pressure at a temperature of from 50° to 60° C. This leaves 44.8 parts of a reaction product which in the form of the free acid conforms to the formula

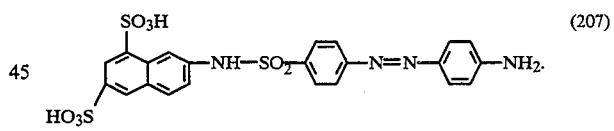

(207)

11.24 parts of the compound of formula (207) obtained as described above are dissolved in 100 parts of water at a neutral pH and 5 parts of 4N sodium nitrite solution are added. The solution is added dropwise to a mixture of 100 parts of ice and 5 parts of approximately 32% hydrochloric acid solution. The reaction mixture is then stirred for about 60 minutes and added dropwise to a solution prepared beforehand by dissolving 2.9 parts of 2-naphthol in 100 parts of water in the presence of 10 parts of 2N sodium hydroxide solution and 2.12 parts of sodium carbonate and then cooling to a temperature of about 2° C. Then the reaction mixture is stirred for about 17 hours. After addition of 8.5 parts of sodium chloride the precipitated dye is filtered off, washed with dilute aqueous sodium chloride solution and dried under reduced pressure at a temperature of from 50° to 60° C. This leaves 14 parts of a dye which in the form of the free acid conforms to the formula

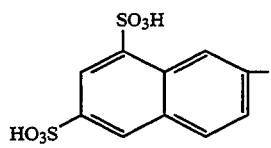
(208)

The dye of the formula (208) dyes natural and synthetic polyamide and leather in red shades.

EXAMPLES 103 TO 125

The procedure described in Example 102 is repeated, except that the 45.8 parts of the compound of the formula (205) are replaced by an equimolar amount of one of the amines shown below in column 2 of the Table 2 in the form of the free acid, affording similar dyes which dye natural and synthetic polyamide and leather in red shades.

TABLE 2-continued

| Ex. | Amine | |
|---|---|---|
| 119 | | (229) |
| 120 | | (230) |
| 121 | | (231) |
| 122 | | (232) |
| 123 | | (233) |
| 124 | | (234) |
| 125 | | (235) |

EXAMPLE 126 a) 37.95 parts of aniline-2,5-disulfonic acid are reacted in 100 parts of water with 3-nitrobenzenesulfonylchloride at a pH of from 4 to 7. This leaves a solution containing the compounds of formulae (236), (237) and (238) in a ratio of approximately 3: 1:1, which in the form of the free acid conform to the formulae:

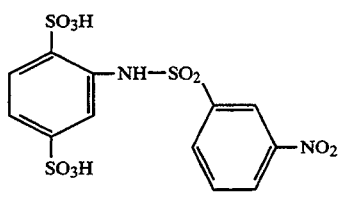         (236)

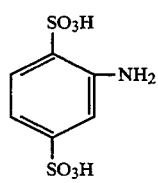         (237)

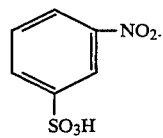         (238)

According to known methods the solution obtained as described above is reduced with iron powder to a solution containing the amines of formulae (239), (237) and (240) in a ratio of approximately 3:1:1, which in the form of the free acid conform to the formulae:

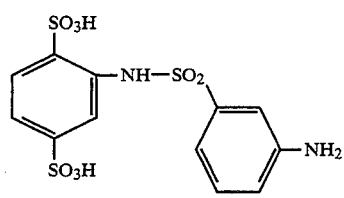         (239)

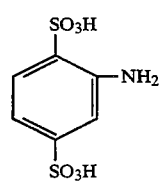         (237)

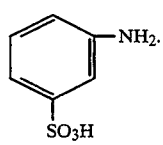         (240)

To 75 parts of the solution thus obtained 12.5 pans of approximately 32% hydrochloric acid solution are added and diazotisation is carried out at a temperature of 2° to 5° C. by addition of 12.5 parts of 4N sodium nitrite solution. Then 9.35 parts of anilino-methane sulfonic acid are added and a pH of 7 is set up by addition of 9 parts of sodium hydrogen carbonate. This leaves 140 parts of a solution containing the compounds of formulae (241), (242) and (243) in a ratio of approximately 3:1:1, which in the form of the free acid conform to the formulae:

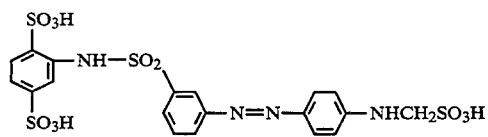         (241)

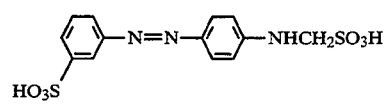         (242)

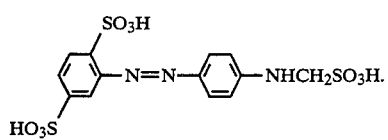         (243)

To the solution thus obtained 35 pans of concentrated aqueous sodium hydroxide solution are added and the solution is heated at the boil for 90 minutes. After cooling down to room temperature a pH of 6.6 is set up by addition of 35 parts of approximately 32%, hydrochloric acid solution. Then 30 parts of sodium chloride are added, the precipitated product is filtered off and washed with diluted sodium chloride solution. This leaves 50 parts of a moist filter cake containing the compounds of formulae (244) and (245) in a ratio of approximately 2:1, which in the form of the free acid conform to the formulae:

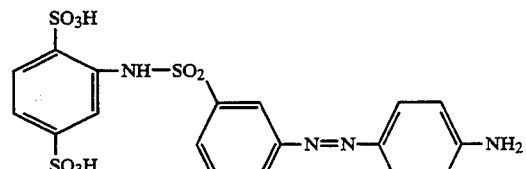
(244)

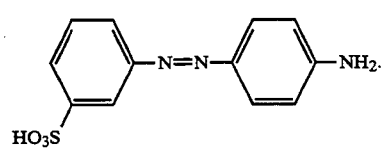
(245)

The reaction product of the compound of formula (243) remains in the filtrate.

b) 50 parts of the moist filter cake obtained according to step a) are stirred into 100 pans of water and 10 parts of approximately 32% hydrochloric acid solution are added. Then diazotisation is carded out by addition of 6 pans of 4N sodium nitrite solution and the suspension of the diazo compound is stirred for 30 minutes at room temperature. The suspension thus obtained is added at a pH of 9-10 to a solution prepared beforehand by dissolving 3.45 parts of 2-naphthol in 100 parts of water in the presence of 12 pans of 2N sodium hydroxide solution, keeping the pH at a value of 9-10 by addition of diluted sodium hydroxide solution. After addition of 48 pans of sodium chloride the precipitated dye is filtered off at a pH of 8, washed with dilute aqueous sodium chloride solution and dried under reduced pressure at a temperature of from 50° to 60° C. This leaves 12.8 parts of a dye mixture containing the dyes of the formulae (246) and (247) which in the form of the free acid conform to the formulae

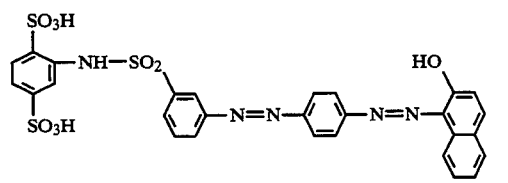
(246)

and

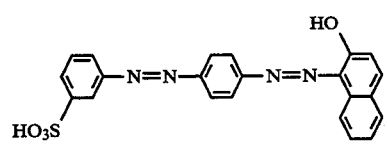
(247)

in a ratio of about 2:1. The dye mixture of the dyes of the formulae (246) and (247) dyes natural and synthetic polyamide and leather in red shades.

Similar dye mixtures containing the dyes of formulae

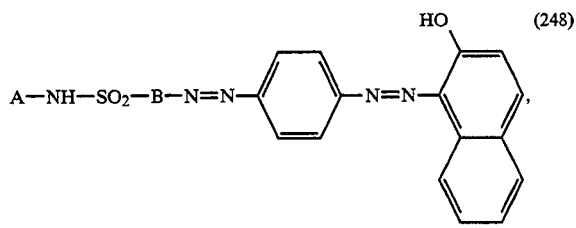
(248)

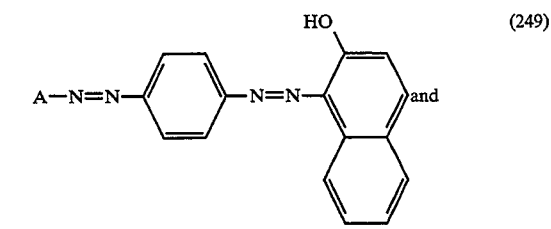
(249) and

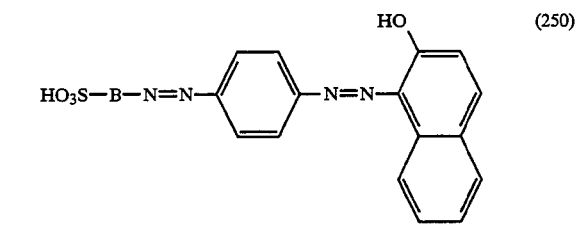
(250)

can be obtained by repeating the procedure of Example 126, except that in step a) of Example 126 the 37.95 pans of aniline-2,5-disulfonic acid are replaced by an equimolar amount of a compound of formula A—NH₂ and the 33.23 pans of 3-nitro-benzenesulfonylchlofide are replaced by an equimolar amount of a compound of formula $NO_2$—B—$SO_2Cl$,l taking the appropriate compounds of fomulae A—$NH_2$ and $NO_2$—B—$SO_2C_1$ that are necessary for the preparation of the amines of Examples 103 to 111,114, 116, 118, 120, 122 or 124.

Based on the solubility the dyes of formulae (249) and/or (250), or one of the precursors of these dyes, can remain in the flitrate after filtration. In this case the filter cake only contains the dye of formula (248) or a mixture of the dyes of formulae (248) and (249) or a mixture of the dyes of formulae (248) and (250). The mixtures of dyes obtainable after filtration and drying dye natural and synthetic polyamide and leather in red shades.

Dyeing Method I 10 parts of nylon-6.6 fabric are dyed in 500 pans of an aqueous liquor containing 2 g/l of ammonium acetate, adjusted to pH 5 with acetic acid. The proportion of dye of Example 1 is 0.7% on weight of fibre. The dyeing time at a temperature of 98° is 30 to 90 minutes. The dyed nylon-6.6 fabric is then removed and washed and dried as usual.

The result obtained is a red nylon-6.6 fabric which has a clean shade and good all round fastness properties.

Dyeing Method II 10 parts of nylon-6.6 fabric are dyed in 500 parts of an aqueous liquor containing 1 g/l of monosodium phosphate, adjusted to pH 6 with disodium phosphate. The proportion of dye of Example 3 is 1% on weight of fibre. The dyeing time at a temperature of 98° is 30 to 90 minutes. The dyed nylon-6.6 fabric is then removed and washed and dried as usual.

The result obtained is a red nylon-6.6 fabric which has a clean shade and good all round fastness properties.

Dyeing Method III 10 parts of wool piece goods are dyed in 500 parts of an aqueous liquor. On weight of fibre the proportion of dye of Example 1 is 0.45%, the proportion of calcined Glauber salt is 5% and the proportion of 80% acetic acid is 2%. The dyeing time at a temperature of 98° is 30–60 minutes. After conventional washing and drying, the red-dyed wool piece has very good all round fastness properties.

Dyeing Method IV 100 parts of apparel suede leather are drummed at 50° in a solution of 1000 parts of water and 2 parts of 24% ammonia for 2 hours and then dyed at 60° in a solution of 1000 parts of water, 2 parts of 24% ammonia and 3 parts of dye of Example 1 for 1 hour. Thereafter a solution of 40 parts of water and 4 parts of 85% formic acid is actded and the dyeing is continued for a further 30 minutes. The leather is then thoroughly rinsed and if necessary additionally treated with 2 parts of a dicyandiamide-formaldehyde condensation product at 50° for 30 minutes. The red dyeing obtained has good fastness properties.

Printing Method (fabric print)

Woven nylon-6 or nylon-6.6 material is printed on a conventional textile printing machine with a print paste containing per 1000 g:
a) 20 g of the dye of Example 1,
b) 50 g of urea,
c) 50 g of thiodiethylene glycol,
d) 320 g of water,
e) 500 g of 10% bean gum or guar flour derivative, and
f) 60 g of 15 Bé ammonium tartrate solution.

The printed material is dried in a drying cabinet at 70° to 80° and then steamed with saturated steam at 101° to 103° for 20 to 30 minutes. The material is then rinsed cold for 10 minutes, washed at 50° to 60° with 2 g/l of synthetic detergent for 15 minutes, again rinsed cold and then dried. This gives a level print having a red shade, crisp outlines and good fastness properties.

To assess the state of fine division, the print paste is applied in dilute form. The printed material is found to be speckle-free.

The present invention relates to novel azo dyes, to their preparation and to the use thereof for dyeing and printing fibre materials, especially textile fibre materials.

Specifically, the invention relates to azo dyes of formula

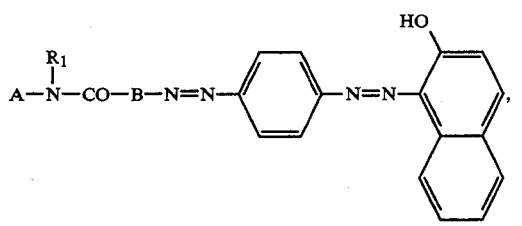

wherein $R_1$ is hydrogen or $C_1$–$C_8$alkyl, B is unsubstituted or substituted phenytene or naphthylene, and A is a radical of formula

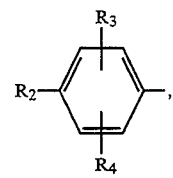

wherein $R_2$, $R_3$ and $R_4$ are each independently of one another hydrogen, $C_1$–$C_8$alkyl, $C_1$–$C_8$alkoxy, halogen, carboxy, or are phenylaminosulfonyl, naphthylaminosuifonyl, phenylaminocarbonyl or naphthylaminocarbonyl which may be fur $C_1$–$C_4$alkyl, $C_1$–$C_4$alkoxy, halogen, carboxy or sulfo, and $R_3$ and $R_4$ may additionally be sulfo, or a radical of formula

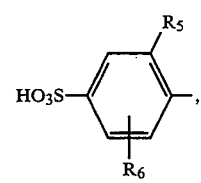

wherein $R_5$ is $C_1$–$C_8$alkoxy, halogen, carboxy or sulfo, and $R_6$ is hydrogen, $C_1$–$C_8$alkyl, $C_1$–$C_8$alkoxy, halogen, carboxy or sulfo, or a radical of formula

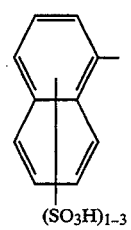

or a radical of formula

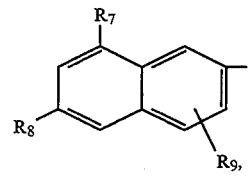

wherein $R_7$, $R_8$ and $R_9$ are each independently of one another hydrogen or sulfo.

Possible substituents of the radical B are alkyl groups of 1 to 8, preferably 1 to 4, carbon atoms, typically methyl, ethyl, n-propyl, isopropyl, n-butyl, isobutyl, sec-butyl, tert-butyl, pentyl, hexyl, heptyl or octyl; alkoxy groups of 1 to 8, preferably 1 to 4, carbon atoms, typically methoxy, ethoxy, n-propoxy, isopropoxy, n-butoxy, isobutoxy, sec-butoxy or tert-butoxy; acylamino groups such as alkanoylamino groups of 2 to 8 carbon atoms and alkoxycarbonylamino groups of 2 to 8 carbon atoms, typically acetylamino, propionylamino, methoxycarbonylamino, ethoxycarbonylamino; alkanoyl groups of 2 to 8, preferably 2 to 4, carbon atoms, typically acetyl, propionyl, butyryl or isobutyryl; nitro, cyano, trifiuoromethyl; halogen, typically fiuoro, bromo or, preferably, chloro; carbamoyl, sulfamoyl, ureido, hydroxy, carboxy or sulfo. The radical B is preferably unsubstitttted or substituted by $C_1-C_8$alkyl, $C_1-C_8$alkoxy, halogen, carboxy or sulfo.

$C_1-C_8$Alkyl represented by $R_1$, $R_2$, $R_3$, $R_4$ and $R_6$ is preferably $C_1-C_4$alkyl and will typically be methyl, ethyl, n-propyl, isopropyl, n-butyl, isobutyl, sec-butyl or tert-butyl. $C_1-C_8$Alkoxy represented by $R_2$, $R_3$, $R_4$, $R_5$ and $R_6$ is preferably $C_1-C_4$alkoxy and will typically be methoxy, ethoxy, n-propoxy, isopropoxy, n-butoxy, isobutoxy, sec-butoxy or tert-butoxy.

Halogen represented by $R_2$, $R_3$, $R_4$, $R_5$ and $R_6$ will typically be fluoro, bromo or, preferably, chloro.

$R_2$, $R_3$ and $R_4$ as phenylaminosulfonyl, naphthylaminosulfonyl, phenylaminocarbonyl or naphthylaminocarbonyl may be further substituted by $C_1-C_4$alkyl such as methyl, ethyl, n-propyl, isopropyl, n-butyl, isobutyl, sec-butyl or tert-butyl, $C_1-C_4$alkoxy such as methoxy, ethoxy, n-propoxy, isopropoxy, n-butoxy, isobutoxy, secobutoxy or tert-butoxy, halogen such as fluoro, bromo or, preferably, chloro, carboxy or, preferably, sulfo.

The azo dyes of formula (1) preferably contain one or two sulfo groups, most preferably two sulfo groups.

Preferred azo dyes of formula (1) are those wherein B is unsubstituted or substituted phenylene, preferably phenylene which is unsubstituted or substituted by $C_1-C_8$alkyl, $C_1-C_8$alkoxy, halogen, carboxy or sulfo.

Also preferred are azo dyes of formula (1), wherein $R_1$ is hydrogen, methyl or ethyl, preferably hydrogen.

Preferred radicals A in formula (2) are those wherein $R_2$ is hydrogen, halogen, or phenylaminosulfonyl, naphthylaminosulfonyl, phenylaminocarbonyl or naphthylaminocarbonyl which may be further substituted by sulfo, and $R_3$ and $R_4$ are each independently of the other hydrogen, sulfo, or phenylaminosulfonyl, naphthylaminosulfonyl, phenylaminocarbonyl or naphthylaminocarbonyl which may be further substituted by sulfo.

Particularly preferred radicals A of formula (2) are those wherein $R_2$ is hydrogen halogen, and $R_3$ and $R_4$ are each independently of the other hydrogen or sulfo.

Preferred radicals A of formula (3) are those wherein $R_5$ is halogen, carboxy or sulfo. preferably carboxy, and $R_6$ is hydrogen, halogen, carboxy or sulfo.

The radicals A of formula (4) preferably contain only two sulfo groups.

Preferred radicals A of formula (5) are those wherein one of the substituents $R_7$, $R_8$ and $R_9$ is hydrogen and the other two are sulfo, preferably those wherein $R_9$ is hydrogen and $R_7$ and $R_8$ are sulfo.

The azo dyes of formula (1) preferably contain a radical A of formula (2), (4) or (5), most preferably a radical of formula (4) or (5). The radical A of formula (5) is especially preferred.

Particularly preferred are azo dyes of formula

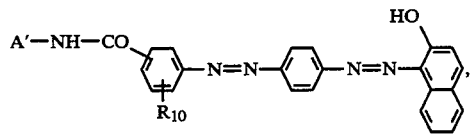
(6)

wherein $R_{10}$ is hydrogen, $C_1-C_8$alkyl, $C_1-C_8$alkoxy, halogen, carboxy or sulfo, preferably hydrogen or methyl, and A' is a radical of formula

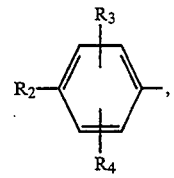
(2)

wherein $R_2$ is hydrogen or halogen, and $R_3$ and $R_4$ are each independently of the other hydrogen or sulfo, or a radical of formula

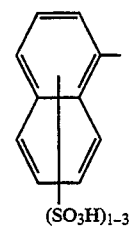
(4)

or a radical of formula

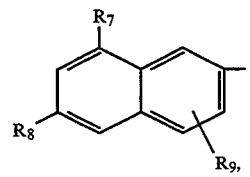
(5)

wherein $R_7$, $R_8$ and $R_9$ are each independently of one another hydrogen or sulfo.

Very particularly preferred azo dyes are those of formula (6), wherein A' is a radical of formula (4) or (5), preferably a radical of formula (5).

The invention further relates to a process for the preparation of the novel azo dyes, which comprises diazotising an amine of formula

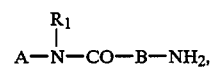
(7)

wherein A, B and $R_1$ are as defined for formula (1), and coupling the diazotised amine to a compound of formula

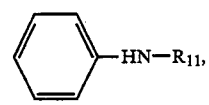
(8)

wherein $R_{11}$ is hydrogen or $-CH_2-SO_3H$, and reacting the product so obtained, if $R_{11}$ is $-CH_2SO_3H$, to the compound of formula

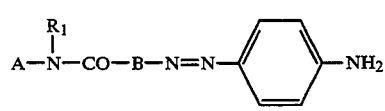
(9)

diazotising the compound of formula (9) and coupling the diazotisation product to a compound of formula

The diazotisation of the compounds of formulae (7) and (9) is carried out in per se known manner, conveniently with a nitrite such as an alkali metal nitrite, typically sodium nitrite, in a mineral acid medium, conveniently in hydrochloric acid, in the temperature range from −5° to +30° C., preferably from 0° to 10° C.

The coupling to the coupling components of formulae (8) and (10) is carried out in a manner known per se, in the acid, neutral or weakly alkaline pH range, preferably in the pH range from c. 5 to 12, and in conveniently the temperature range from −5° to +70° C., preferably from 10° to 60° C.

It is only necessary to react the reaction product of the coupling of the compound of formula (7) to the compound of formula (8) to give the compound of formula (9) if a compound of formula (8) is used wherein $R_{11}$ is —$CH_2$—$SO_3H$. In this case, the reaction is carried out in the presence of a base, conveniently sodium hydroxide, in the temperature range from 10° to 50° C., preferably from 20° to 40° C.

The substituent $R_1$ as alkyl can also be introduced after the preparation of the dye formula (1), conveniently by alkylation with dialkyl sulfate, dialkyl carbonate, dialkyl methanephosphonate or methyl tosylate derivatives, in aqueous solution, by methods which are known per se.

In the inventive process for the preparation of the azo dyes of formula (1), the meanings and preferred meanings stated above apply to the radicals A, B and $R_1$ of the amine of formula (7).

A preferred embodiment of the inventive process comprises using a compound of formula (8), wherein $R_{11}$ is the radical —$CH_2$—$SO_3H$, and reacting the reaction product of the coupling of the compound of formula (7) to the compound of formula (8) to give the compound of formula (9).

A particularly preferred embodiment of the inventive process comprises using as amine of formula (7) an amine of formula

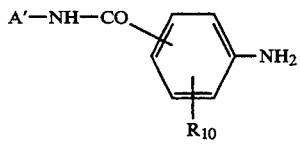

wherein $R_{10}$ and A′ have the meanings and preferred meanings assigned to them in the definition of formula (6).

The amines of formula (7) and the compounds of formula (8) are known or can be prepared by methods analogous to those for obtaining known compounds.

The azo dyes of formula (1) are obtained in the form of the free acid or, preferably, of their salts.

Suitable salts are typically the alkali metal or ammonium salts or the salts of an organic amine. Illustrative examples of such salts are the sodium, lithium, potassium or ammonium salts or the salt of mono-, di- or triethanolamine.

The azo dyes of formula (1) are suitable for dyeing and printing preferably nitrogen-containing or hydroxyl group-containing fibre materials, paper or leather, typically textile materials of cellulose, silk and, especially, wool and synthetic polyamides, by methods which are known per se. The novel azo dyes of formula (1) can be used for dyeing and printing in conventional and, in some cases, preprepared formulations for dyeing and printing. Level dyeings in red shades of good all-round fastness properties, especially good fastness to rubbing, wet treatments, wet rubbing and light are obtained. The novel dyes also have very good water-solubility. In addition, they have good build-up and have very good compatibility with other dyes. The textile material can be in any form of presentation, conveniently as fibres, yarn, wovens or knitgoods.

In the following Examples parts are by weight. The relationship between between parts by weight and parts by volume is the same as that between the gram and the cubic centimetre.

Example 1

In a first step, a mixture of 41 parts of a 41% aqueous solution of sodium hydrogen sulfite and 13 parts of a 37% aqueous solution of formaldehyde is prepared. The mixture is stirred for a brief time and then 13.95 parts of aniline are added at 65° C. A clear solution forms slowly and solidifies in crystalline form after 2 hours upon cooling. The reaction mixture is then diluted with 140 parts of water, heated to 60° C. and stirred until a clear solution forms. The solution is cooled to 5° C. by addition of ice. Then 16.8 parts of sodium hydrogencarbonate are added.

In a second step, 63.3 parts of a compound which, in the form of the free acid, corresponds to the formula

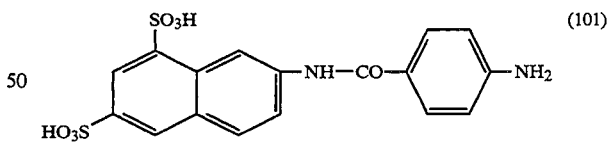

are dissolved in a separate reaction flask in 150 parts of water at pH 7.5 with a concentrated aqueous solution of sodium hydroxide and to the solution are then added 37.5 parts of a solution of 4N sodium nitrite. The reaction mixture is added dropwise to a mixture of 150 parts of ice and 37.5 parts of a c. 32% solution of hydrochloric acid. The diazo suspension so obtained is added to the solution obtained in the first step. The coupling is then carried out at pH 6.5-7, which is maintained by addition of 4.5 parts of sodium hydrogencarbonate, and at a temperature of 48°-50° C., giving 915 parts of a solution which contains the reaction product that, in the form of the free acid, corresponds to the compound of formula

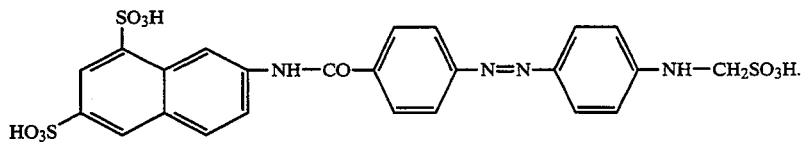
(102)

Afterwards, 80 parts of sodium hydroxide (98%) are added at room temperature to 915 parts of the solution obtained above. After stirring for c. 2 hours at room temperature, the pH is adjusted to 10 with c. 40% acetic acid. After addition of sodium chloride and filtration, the moist reaction product is dissolved at pH 11.5 in 150 parts of water. After further addition of sodium chloride and filtration, the filter product is dried at 50°–60° C. under vacuum, giving 30 parts of a reaction product which, in the form of the free acid, corresponds to the compound of formula

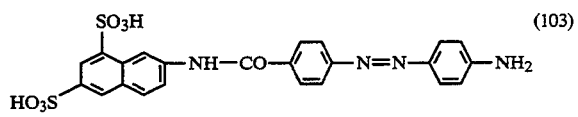
(103)

5.26 parts of the compound of formula (103) obtained above are dissolved in 75 parts of water by adding a dilute aqueous solution of sodium hydroxide at pH 8–9 and to the solution are added 2.5 parts of a 4N aqueous solution of sodium nitrite. The low viscosity suspension is warmed to 55° C. and added dropwise to a mixture of 75 parts of ice and 3 parts of a c. 32% solution of hydrochloric acid. The reaction mixtrure is subsequently stirred for 30 minutes and added to a preprepared solution while keeping the pH at c. 10.5 and the temperature at 13°–20° C. This solution is prepared beforehand by dissolving 1.44 parts of 2-naphthol in 100 parts of warm water by adding 6 parts of 2N aqueous sodium hydroxide and then cooling the solution to 20° C. When coupling is complete, 250 parts of alcohol (95%) are added to the reaction mixture, and the precipitateci dye is isolated by filtration at 35° C., washed with dilute aqueous sodium chloride solution and alcohol, and dried at 50°–60° C. under vacuum, giving 6.34 parts of a dye which. in the form of the free acid, corresponds to the compound of formula

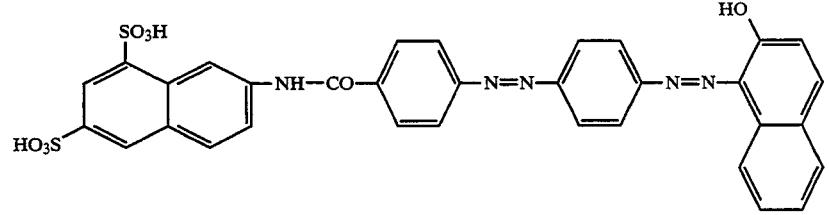
(104)

The dye of formula (104) dyes natural and synthetic polyamide fibre material in rect shades.

Examples 2–35

The procedure described in Example 1 is repeated, but replacing 63.3 parts of the compound of formula (101) with one of the amines listed in coltiron 2 of the following Table in the form of the free acid to give analogous dyes that dye natural and synthetic polyamide fibre material in red shades.

TABLE

| Ex. | Amine |
|---|---|
| 2 | ![structure] |
| 3 | ![structure] |
| 4 | ![structure] |
| 5 | ![structure] |
| 6 | ![structure] |
| 7 | ![structure] |
| 8 | 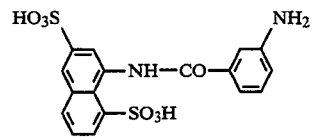 |

| Ex. | Amine |
|---|---|
| 9 | 4-amino-N-(3-aminobenzoyl)naphthalene-2,6-disulfonic acid derivative (HO₃S at 6-position, NH-CO-C₆H₄-NH₂ at 1, SO₃H at other position) |
| 10 | Naphthalene-1,5-disulfonic acid, 2-(4-aminobenzoylamino)- |
| 11 | Naphthalene-2,6-disulfonic acid, 3-(4-aminobenzoylamino)- |
| 12 | Naphthalene-2,4-disulfonic acid, 1-(4-aminobenzoylamino)- |
| 13 | Naphthalene-4,8-disulfonic acid, 1-(4-aminobenzoylamino)- |
| 14 | Naphthalene-4,7-disulfonic acid, 1-(4-aminobenzoylamino)- |
| 15 | Naphthalene-2,5-disulfonic acid, 1-(4-aminobenzoylamino)- |
| 16 | Naphthalene-2,6-disulfonic acid, 1-(4-aminobenzoylamino)- |
| 17 | Naphthalene-5,7-disulfonic acid, 2-[N-methyl-N-(3-aminobenzoyl)amino]- |
| 18 | Naphthalene-1,5-disulfonic acid, 7-[N-methyl-N-(3-aminobenzoyl)amino]- |
| 19 | Naphthalene-2,6-disulfonic acid, 3-[N-methyl-N-(3-aminobenzoyl)amino]- |
| 20 | Naphthalene-2,6-disulfonic acid, 4-[N-methyl-N-(3-aminobenzoyl)amino]- |
| 21 | Naphthalene-5,7-disulfonic acid, 2-[N-methyl-N-(4-aminobenzoyl)amino]- |
| 22 | Naphthalene-1,5-disulfonic acid, 7-[N-methyl-N-(4-aminobenzoyl)amino]- |
| 23 | Naphthalene-2,6-disulfonic acid, 3-[N-methyl-N-(4-aminobenzoyl)amino]- |
| 24 | Naphthalene-2,6-disulfonic acid, 4-[N-methyl-N-(4-aminobenzoyl)amino]- |
| 25 | 2,4-disulfo-N-(4-aminobenzoyl)aniline |
| 26 | 2,4-disulfo-N-(3-aminobenzoyl)aniline |
| 27 | 2-carboxy-4-sulfo-N-(4-aminobenzoyl)aniline |
| 28 | 2-carboxy-4-sulfo-N-(3-aminobenzoyl)aniline |
| 29 | 3-chloro-4-sulfo-N-(4-aminobenzoyl)aniline (actually: 4-amino-2-chloro-5-sulfo, with NHCO-C₆H₄-NH₂) |
| 30 | 3-chloro-4-sulfo-N-(3-aminobenzoyl)aniline |

*Note: The table shows structural diagrams of aromatic amines. The rows above give interpretive chemical names approximating the drawn structures (naphthalene or benzene cores bearing SO₃H, COOH, Cl substituents, linked via -NH-CO- or -N(CH₃)-CO- to an aminobenzoyl group).*

TABLE-continued

| Ex. | Amine |
|---|---|
| 31 | (naphthalene with SO3H, HO3S, -NH-CO-phenyl(CH3)-NH2) |
| 32 | (phenyl with SO3H, HO3S, -NH-CO-phenyl(CH3)-NH2) |
| 33 | (naphthalene with SO3H, HO3S, -NH-CO-phenyl-NH-CO-phenyl-NH2) |
| 34 | (naphthalene with SO3H, HO3S, -NH-SO2-phenyl-NH-CO-phenyl-NH2) |
| 35 | (phenyl with SO3H, HO3S, -NH-SO2-phenyl-NH-CO-phenyl-NH2) |

Dyeing Example I 10 parts of polyamide 66 fabric are dyed in 500 parts of an aqueous liquor containing 2 g/l of ammonium acetate and adjusted to pH 5 with acetic acid. The amount of dye of Example 1 is 0.6%, based on the weight of the fabric. The dyeing time is 30 to 90 minutes at a temperature of 98° C. The dyed polyamide fabric is then removed from the bath and washed and dried in conventional manner.

The polyamide 66 fabric is dyed in a pure red shade of good allround fastness properties.

Dyeing Example II 10 parts of polyamide 66 fabric are dyed in 500 parts of an aqueous liquor containing 1 g/l of monosodium phosphate and adjusted to pH 6 with disodium phosphate. The amount of dye of Example 2 is 1.1%, based on the weight of the fabric. The dyeing time is 30 to 90 minutes at a temperature of 98° C. The dyed polyamide fabric is then removed from the bath and washed and dried in conventional manner.

The polyamide 66 fabric is dyed in a pure red shade of good allround fastness properties.

Dyeing Example III 10 parts of woollen piece goods are dyed in 500 parts of an aqueous liquor. Based on the weight of the fabric, the liquor contains 0.55% of dye of Example 1, 5% of calcined Glauber's salt, and 2% of 80% acetic acid. The dyeing time is 30 to 90 minutes at a temperature of 98° C. The red dyeing obtained on the conventionally washed and dried woolen fabric has very good allround fastness properties.

Dyeing Example IV 100 parts of garment suede leather are wet back for 2 hours at 50° C. in a solution of 1000 parts of water and 2 parts of 24% ammonia, and then dyed for 1 hour at 60° C. in a solution of 1000 parts of water, 2 parts of 24% ammonia and 3 parts of the dye of Example 1. Then a solution of 40 parts of water and 4 parts of 85% formic acid is added and dyeing is continued for another 30 minutes. The leather is then well rinsed and given an optional additional treatment with 2 parts of a dicyandiamide/formaldehyde condensate for 30 minutes at 50° C. A red dyeing of good fastness properties is obtained.

Printing Example (Textile printing)

Woven polyamide 6 or polyamide 66 fabric is printed on a standard textile printing machine with a paste comprising, based on 1000 g of printing paste:

a) 20 g of the dye of Example 1,
b) 50 g of urea
c) 50 g of thiodiethylene glycol,
d) 320 g of water
e) 500 g of plant seed gum or guar gum derivative, 10%, and
f) 60 g of ammonium tartrate solution of 15 Bé.

The printed fabric is dried at 70°-80° C. in a drying oven and then steamed for 20-30 minutes with saturated steam of 101°-103° C. The goods are then washed cold for 10 minutes, washed for 15 minutes at 50°-60° C. with 2 g/l of a synthetic detergent, washed once more and then dried. A level red print with sharp contours and good fastness properties is obtained.

To determine the homogeneity, the printing paste is applied in dilute form. The printed fabric is found to be non-specky.

What is claimed is:

1. An azo dye of the formula

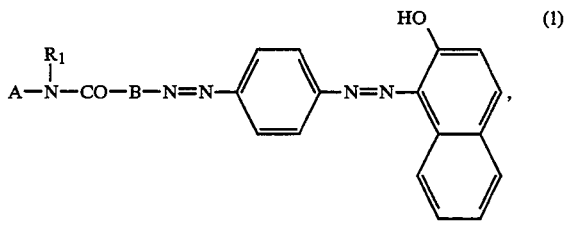

(1)

wherein $R_1$ is hydrogen or $C_1$–$C_8$alkyl, B is phenylene or naphthylene, each of which is unsubstituted or substituted by $C_1$–$C_8$alkyl, $C_1$–$C_8$alkoxy, $C_2$–$C_8$alkanoylamino, $C_2$–$C_8$alkoxycarbonylamino, $C_2$–$C_8$alkanoyl, nitro, cyano, trifluoromethyl, halogen, carbamoyl, sulfamoyl, ureido, hydroxy, carboxy or sulfo and A is a radical of the formula

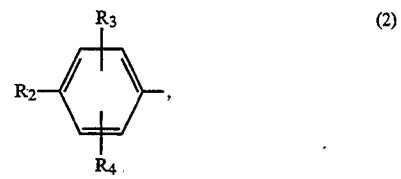

(2)

wherein $R_2$, $R_3$ and $R_4$ are each independently of one another hydrogen, $C_1$–$C_8$alkyl, $C_1$–$C_8$alkoxy, halogen, carboxy, or phenylaminosulfonyl, naphthylaminosulfonyl, phenylaminocarbonyl or naphthylaminocarbonyl which may be further substituted by $C_1$–$C_4$alkyl, $C_1$–$C_4$alkoxy, halogen, carboxy or sulfo, and $R_3$ and $R_4$ may additionally be sulfo, or a radical of the formula

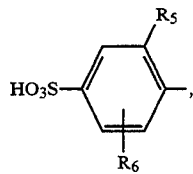

wherein $R_5$ is $C_1$–$C_8$alkoxy, halogen, carboxy or sulfo and $R_6$ is hydrogen, $C_1$–$C_8$alkyl, $C_1$–$C_8$alkoxy, halogen, carboxy or sulfo, or a radical of the formula

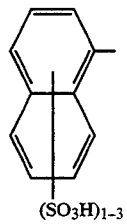

or a radical of the formula

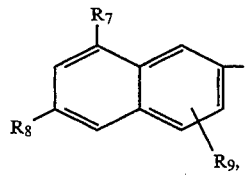

wherein $R_7$, $R_8$ and $R_9$ are each independently of one another hydrogen or sulfo.

2. An azo dye according to claim 1, wherein B is phenylene which is unsubstituted or substituted by $C_1$–$C_8$alkyl, $C_1$–$C_8$alkoxy, halogen, carboxy or sulfo.

3. An azo dye according to claim 1, wherein R1 is hydrogen, methyl or ethyl.

4. An azo dye according to claim 1, wherein $R_2$ is hydrogen, halogen, or is phenylaminosulfonyl, naphthylaminosulfonyl, phenylaminocarbonyl or naphthylaminocarbonyl which may be further substituted by sulfo, and $R_3$ and $R_4$ are each independently of the other hydrogen, sulfo, or phenylaminosulfonyl, naphthylaminosulfonyl, phenylaminocarbonyl or naphthylaminocarbonyl which may be further substituted by sulfo.

5. An azo dye according to claim 1, wherein $R_2$ is hydrogen or halogen, and $R_3$ and $R_4$ are each independently of the other hydrogen or sulfo.

6. An azo dye according to claim 1, wherein A is a radical of formula (2), (4) or (5).

7. An azo dye according to claim 1, of formula

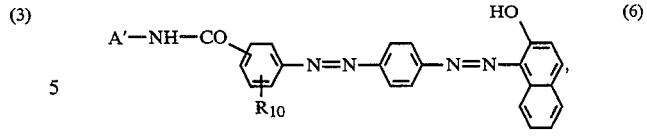

wherein R10 is hydrogen or methyl and A' is a radical of formula

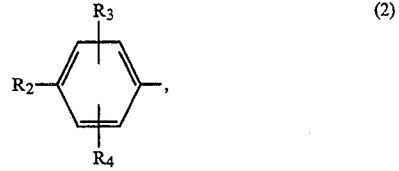

wherein $R_2$ is hydrogen or halogen, and $R_3$ and $R_4$ are each independently of the other hydrogen or sulfo, or a radical of formula

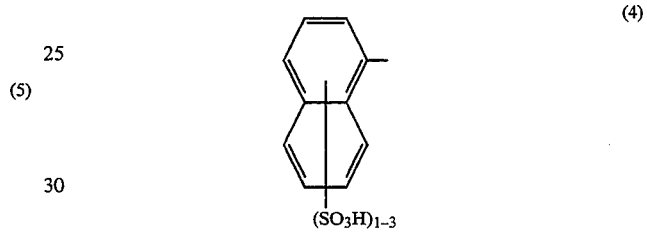

or a radical of formula

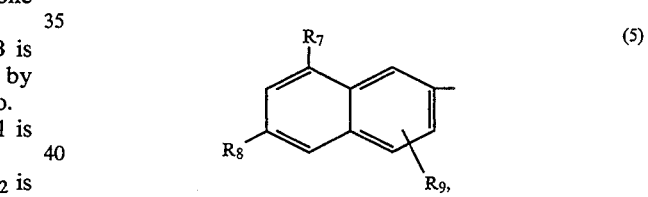

wherein $R_7$, $R_8$ and $R_9$ are each independently of one another hydrogen or sulfo.

8. An azo dye according to claim 7, wherein A' is a radical of formula (4) or (5).

9. An azo dye according to claim 1, wherein the dye of formula (1) contains one or two sulfo groups.

10. An azo dye according to claim 1, wherein R1 is hydrogen.

11. An azo dye according to claim 1, wherein A' is a radical of formula (5).

12. An azo dye according to claim 1, wherein the dye of formula (1) contains two sulfo groups.

* * * * *